Sept. 18, 1928.                                                1,685,048
                     W. J. GAGNON
                 COUPLING FOR BEAD CHAINS
                   Filed June 25, 1927
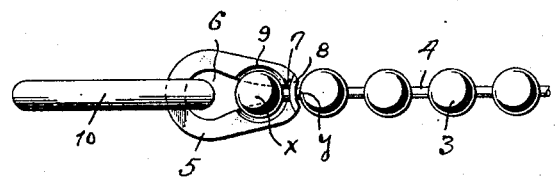
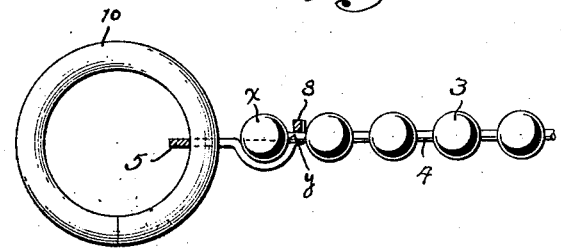
Inventor:
WILLIAM J. GAGNON
By his Attorneys Patented Sept. 18, 1928.

1,685,048

UNITED STATES PATENT OFFICE.

WILLIAM J. GAGNON, OF BRIDGEPORT, CONNECTICUT, ASSIGNOR TO THE BEAD CHAIN MANUFACTURING COMPANY, OF BRIDGEPORT, CONNECTICUT, A CORPORATION OF CONNECTICUT.

COUPLING FOR BEAD CHAINS.

Application filed June 25, 1927. Serial No. 201,538.

My invention relates to coupling devices, and particularly to a device for connecting a bead chain to a jump ring or the like. The object of my invention is to provide a simple and inexpensive coupling which may be readily formed from sheet metal.

In the accompanying drawings—

Fig. 1 is a plan view of a coupling which embodies my invention; and

Fig. 2 is a side elevation at right angles thereto, the coupling device being shown in section.

The present coupling is particularly intended for use with bead chains of the type comprising balls 3 flexibly interconnected by dumbbell links 4. The coupling device proper comprises a sheet metal plate 5 more or less pear shaped, apertured to form at its wider end a hole 6 of sufficient diameter to permit of passage of the end ball $x$ of the chain, and merging, toward the narrower end of the plate, into a slot 7 of less width than the diameter of the ball. The cross web 8 beyond the end of the slot 7 is offset to form a laterally projecting lip. At opposite sides of the slot 7, and spaced slightly from the lip 8, the plate is offset to form a cupped seat 9 corresponding in depth to substantially half the diameter of the ball $x$.

To assemble the coupling with the chain it is necessary merely to pass the end ball $x$ of the chain through the hole 6 from the side of the plate opposite the offset lip 8. The link $y$, which connects ball $x$ to the adjacent ball of the chain, being now in register with the slot 7, the ball is shifted longitudinally into the cupped seat 9. When the chain is swung into line with the plate, the link $y$ bears against the lip 8, restraining the ball from escape, except by reversal of assembly operations. When a device, such as a split jump ring 10 is engaged in the hole 6 of the coupling, the aperture 6 is so obstructed that the ball $x$ cannot escape therethrough.

The particular outline of the plate may be varied, as also the contour of the apertures 6 and 7. If the web 8 is narrow enough, the offsetting thereof may be omitted, or it may be merely channelled to accommodate the link. I prefer the offset lip, however, since the web may thereby be made stronger without interfering with either the link or the adjacent ball.

With the understanding therefore that the details shown may be varied without departing from the thoughts which underlie my invention, I claim—

1. A coupling device for bead chains, comprising a generally flat plate apertured to afford a hole of sufficient diameter to accommodate the end ball of the chain, said hole merging into a slot of less width than the diameter of the ball, but adapted to accommodate a chain link connected to the ball, said slot extending to a point adjacent a margin of the plate and the portions of said plate on opposite sides of said slot being adapted to detain the end ball against substantial lateral movement by a lateral engagement therewith.

2. A coupling device for bead chains, comprising a generally flat plate apertured to afford a hole of sufficient diameter to accommodate the end ball of the chain, said hole merging into a slot of less width than the diameter of the ball, but adapted to accommodate a chain link connected to the ball, said slot extending to a point adjacent a margin of the plate, and the plate on opposite sides of said slot being offset to afford a seat for the ball adapted to engage a portion of the ball.

3. A coupling device for bead chains, comprising a plate apertured to afford a hole of sufficient diameter to accommodate the end ball of the chain, said hole merging into a slot of less width than the diameter of the ball, but adapted to accommodate a chain link connected to the ball, said slot extending to a point adjacent a margin of the plate, and said margin of the plate at the end of said slot being offset to form a restraining lip.

4. A coupling device for bead chains, comprising a plate apertured to afford a hole of sufficient diameter to accommodate the end ball of the chain, said hole merging into a slot of less width than the diameter of the ball, but adapted to accommodate a chain link connected to the ball, said slot extending to a point adjacent a margin of the plate, and the plate on opposite sides of said slot being offset to afford a seat for the ball, and said margin of the plate at the end of said slot being offset to form a restraining lip.

5. A coupling device for bead chains, comprising a generally flat plate apertured within its boundaries to form a hole of sufficient width to accommodate a chain ball, said aperture merging into a slot of less width than the diameter of the ball, but sufficient to accommodate a chain link, in combination with a coupled member passing through the hole and obstructing the latter to prevent escape of the ball therefrom.

In testimony whereof I have signed by name to this specification.

WILLIAM J. GAGNON.